ABOUT
United States Patent [19]

Moyes

[11] Patent Number: 4,598,734
[45] Date of Patent: Jul. 8, 1986

[54] ALARM CHECK VALVE

[75] Inventor: Gregory R. Moyes, Auckland, New Zealand

[73] Assignee: Moygro Manufacturing Limited, Auckland, New Zealand

[21] Appl. No.: 775,698

[22] Filed: Sep. 13, 1985

Related U.S. Application Data

[63] Continuation of Ser. No. 524,072, Aug. 17, 1983, abandoned.

[30] Foreign Application Priority Data

Apr. 8, 1983 [NZ] New Zealand .......................... 203837

[51] Int. Cl.⁴ .................... F16K 15/03; F16K 37/00; F16L 23/02
[52] U.S. Cl. .................. 137/515.7; 137/557; 137/875; 285/412
[58] Field of Search ................... 137/515.7, 557, 875; 285/412

[56] References Cited

U.S. PATENT DOCUMENTS

| 1,211,500 | 1/1917 | Strong | 285/412 |
| 1,514,090 | 11/1924 | Lewis | 137/875 |
| 1,842,381 | 1/1932 | Angell | 137/875 |
| 3,395,727 | 8/1968 | Weise et al. | 137/515.7 |
| 3,612,097 | 10/1971 | Prince | 137/515.7 |
| 3,693,652 | 9/1972 | Iung | 137/557 |
| 3,817,277 | 6/1974 | Wheatley | 137/515.7 |
| 3,835,878 | 9/1974 | Braidt et al. | 137/557 |
| 3,905,392 | 9/1975 | Gray | 137/557 |
| 4,128,111 | 12/1978 | Hansen et al. | 137/515.7 |

Primary Examiner—Alan Cohan
Assistant Examiner—John A. Rivell
Attorney, Agent, or Firm—Cushman, Darby & Cushman

[57] ABSTRACT

An alarm check valve has a tubular body arranged to fit within a pipe line, such as of a sprinkler system. The valve member is pivoted within the body so as to permit one way flow, and is spring biased towards the closed position. A secondary outlet port is normally covered by the closed valve member. When the valve is opened and fluid is flowing, some fluid can flow out the secondary port to operate an alarm.

6 Claims, 7 Drawing Figures ns.
ALARM CHECK VALVE

This is a continuation of application Ser. No. 524,072 filed Aug. 17, 1983 which was abandoned upon the filing thereof.

BACKGROUND OF THE INVENTION

This invention relates to Alarm Check Valves.

Alarm check valves are used in wet pipe automatic sprinkler systems and serve both as an alarm valve to indicate when a sprinkler head has operated, and is a check valve that prevents back flow from a sprinkler system.

Hitherto, alarm check valves have been of large size, accommodating a pivoted clapper within the body of the valve with the valve body being necessarily longer than the diameter of the clapper. Such alarm valves have been permanently installed in the main pipeline to the sprinkler system, and have required the provision of an inspection hatch on the side of the alarm body to enable the clapper to be inspected.

It is an object of this invention to provide an improved alarm check valve, which can be readily removed from the pipeline for servicing.

In one aspect, the invention provides an alarm check valve, said valve including an annular body providing a main flow passage therethrough, opposite ends of said body having substantially flat faces capable of being held between oppositely disposed flanges of a pipeline, a pivotally mounted clapper within said body capable of closing off said main flow passageway, and capable of being pivoted into an open position in which said clapper extends beyond one of said end faces of said body, and a secondary flow passageway in said body leading from a portion of said body covered by said clapper when in the closed position, leading to an outlet port for communication with a sensor capable of detecting flow through said passageway.

By this means, the alarm check valve of this invention is capable of being inserted in a pipeline, is of relatively compact form, and can be removed from the pipeline for inspection as it can be clamped in place by bolts or the like between the oppositely disposed flanges of the pipeline which can be readily removed to enable the alarm check valve to be removed from the pipeline.

DESCRIPTION OF THE PREFERRED EMBODIMENTS

Figure 1:
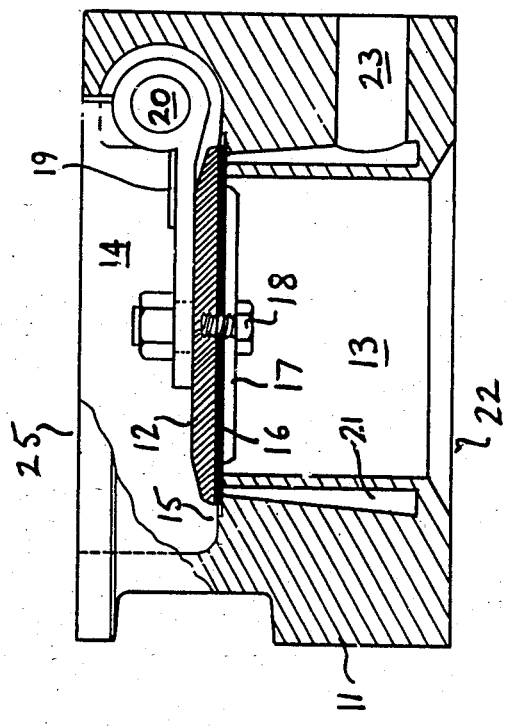
FIG. 1 illustrates a first alarm check valve in cross-section.

The preferred alarm check valve of FIG. 1 is preferably of the wafer check valve type, as it has a relatively compact body 11 and a pivotally mounted valve member or clapper 12, which clapper is capable of pivoting into an open position in which it extends beyond one end of the valve body. The body 11 has a main flow passageway 13 therethrough so that the body is substantially annular and has a cavity 14 in which the clapper 12 is mounted. In the closed position, the clapper is held against a shoulder 15, and preferably has a resilient sealing face 16 which engages the shoulder 15.

Preferably the sealing face is formed by a rubber or neoprene washer or disc held in place by suitable clamping means 17. This may take the form of an annular metal plate held against the clapper by an appropriate fastener 18.

The clapper 12 is pivotally mounted on a pin 20, so that the clapper can be removed for servicing as required. A spring 19 is provided so that the clapper is normally held closed against the shoulder 15, regardless of the valve's orientation, except when pushed open by fluid flow.

Preferably, an alarm port 21 is provided extending from the shoulder 15 back towards the inlet end 22 of the valve. This alarm port 21 is preferably substantially concentric with the main flow passageway 13, and is provided with an outlet passageway 23 positioned in the valve body so as to intersect the alarm passageway 21.

Figure 2:
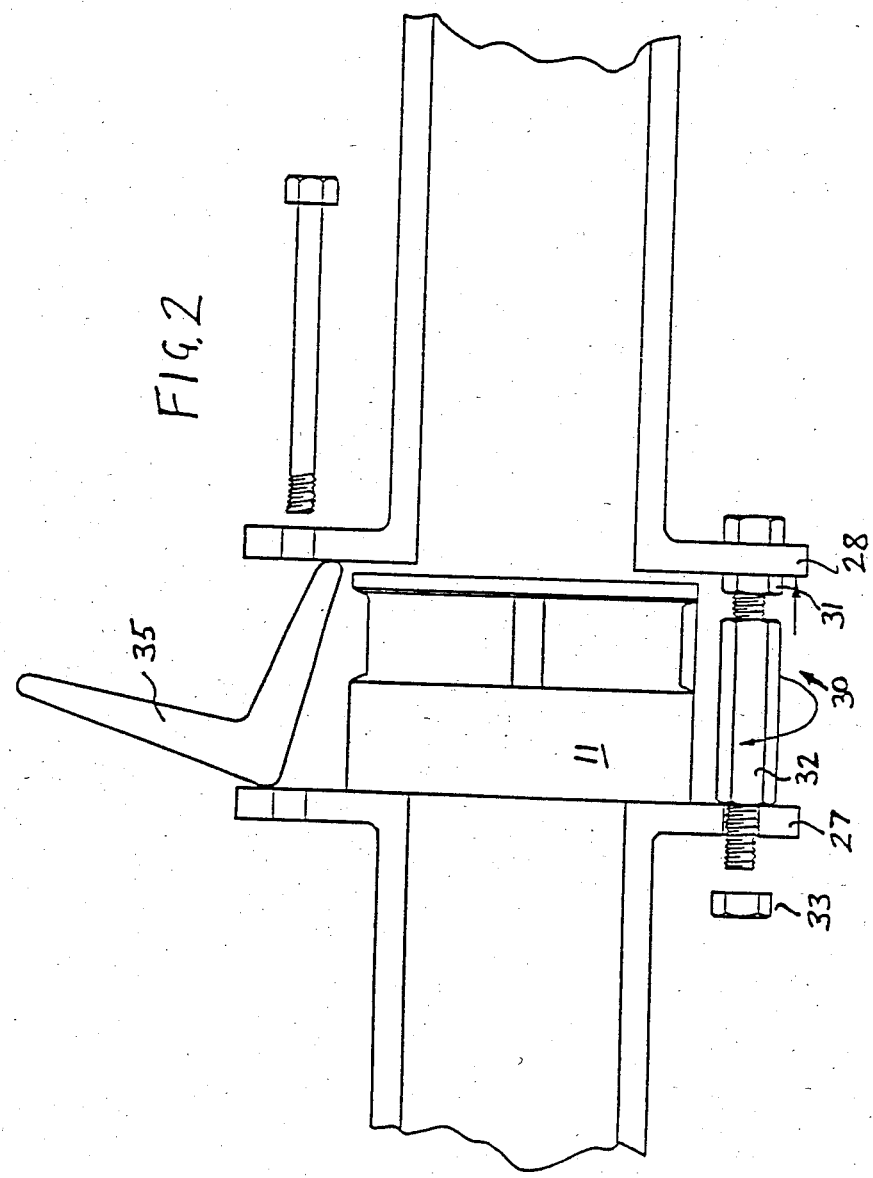
FIG. 2 is a schematic drawing showing the alarm check valve positioned in a pipeline with two alternative means of releasing the check valve from the pipeline.

The end faces 22 and 25 of the valve body are substantially flat so as to be clamped between oppositely disposed flanges 27, 28 of a pipeline (see FIG. 2).

The alarm check valve can be held in place by a plurality of fasteners such as bolts or the like extending around the circumference of the alarm check valve and secured between the oppositely disposed flanges 27, 28 of the pipeline.

It is preferred that jacking means is provided to enable ready release of the alarm check valve. One such jacking means involves the use of a jacking bolt 30 which can serve both as the fastening bolt and as a means for forcing the flanges 27, 28 apart to enable the valve to be removed. For example, the bolt 30 may have a locking nut 31 at one end thereof, and a threaded sleeve 32, positioned between the flanges, so that rotation of the threaded sleeve after removal of the end nut 33 enables the sleeve to force flange 27 away from flange 28.

An alternative jacking means is shown in FIG. 2 in the form of a dog-leg lever 35 which can be inserted between the flanges, and levered to force them apart.

Thus, removal of the alarm check valve for inspection can be readily effected by releasing or loosening the fasteners holding the flanges together, and then applying force between the flanges to provide sufficient clearance for the alarm check valve to be removed. The alarm check valve can be readily replaced in like manner.

Figure 3:
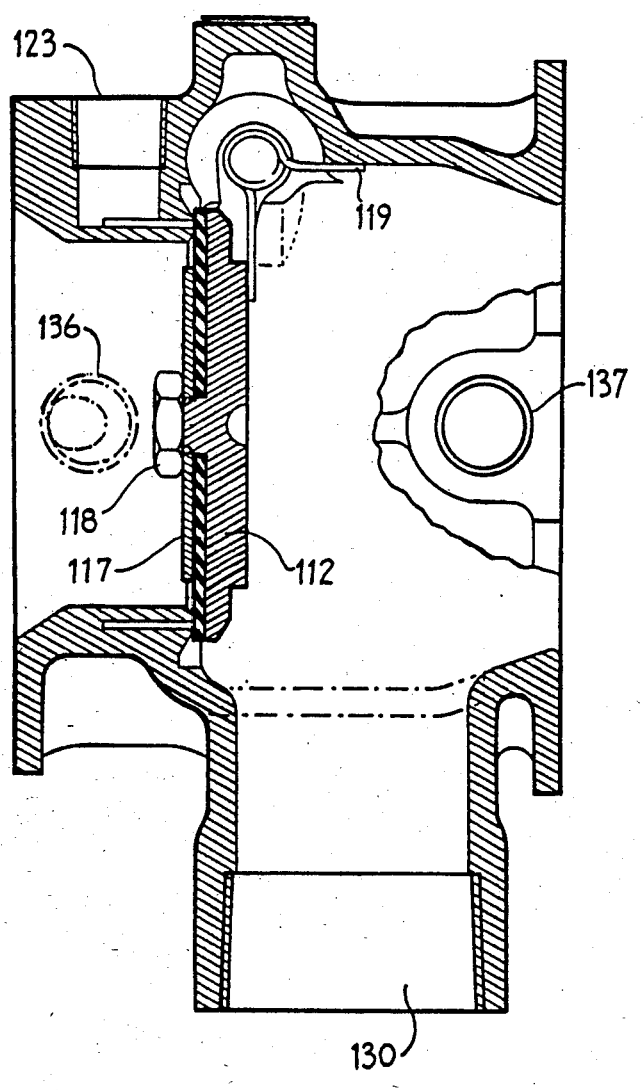
FIG. 3 illustrates a second alarm check valve in cross-section.
Figure 4:
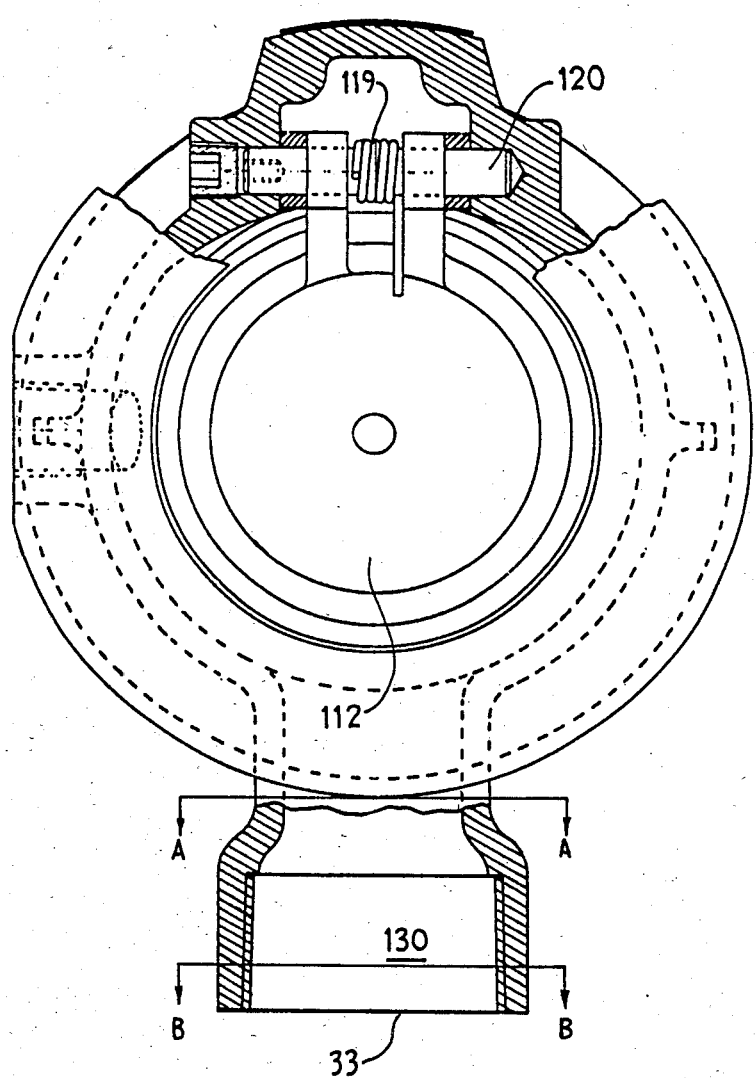
FIG. 4 illustrates the alarm check valve of FIG. 3 in end elevation, and partial section showing the position of the clapper.
Figure 5:
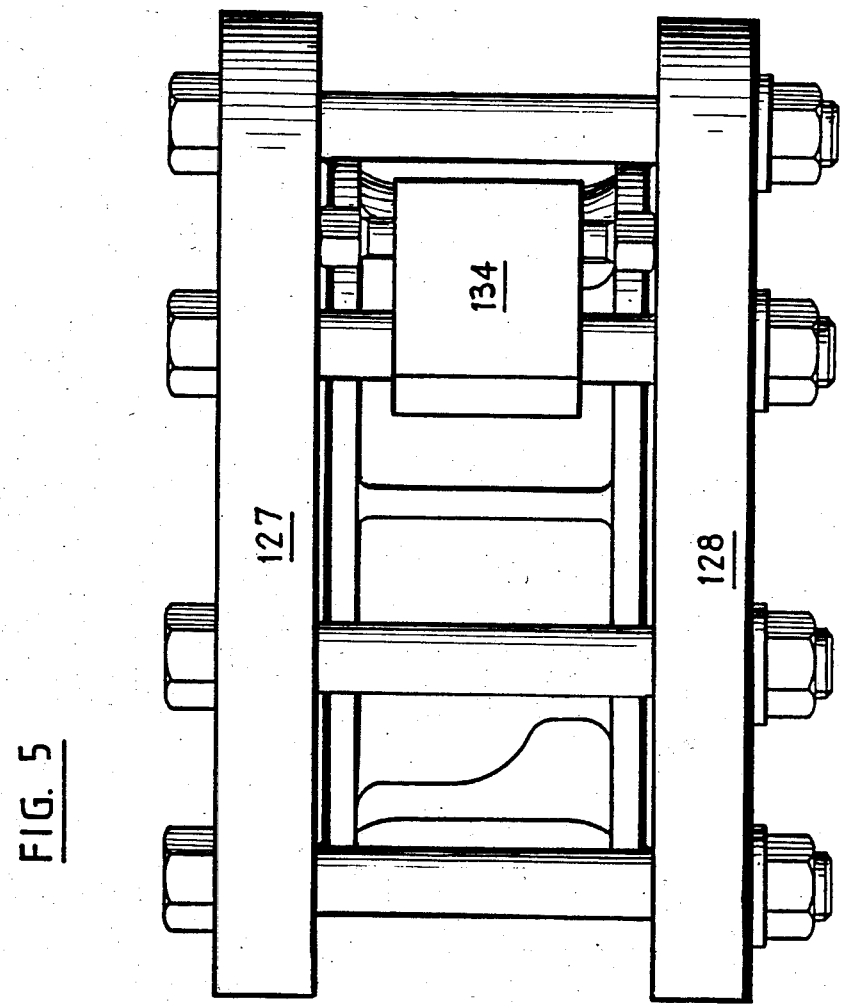
FIG. 5 illustrates the mounting of this valve between pipe flanges, with a flange jack in place.

Referring now to FIGS. 3, 4 and 5, a second embodiment of the present invention will be described, using substantially the same numbering as that used above with reference to FIGS. 1 and 2, but with a numeral 1 in front.

Figure 6:
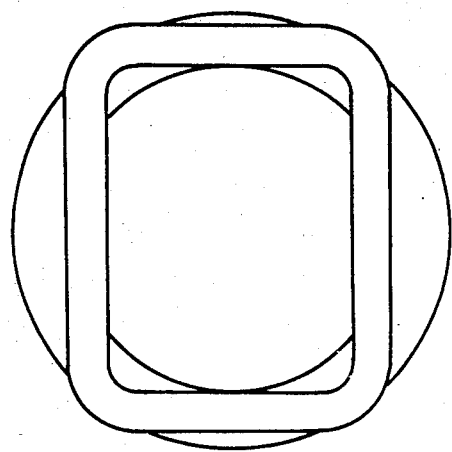
FIG. 6 is a cross-sectional view on line A—A of FIG. 4.
Figure 7:
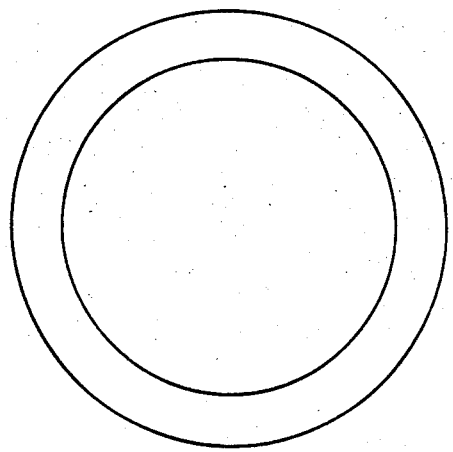
FIG. 7 is a cross-sectional view on line B—B of FIG. 4.

The alarm check valve shown in FIGS. 3 through 5, is a modification of the check valve in FIG. 1, but having a main drain connection 130 extending from the opposite side of the valve to the alarm outlet 123. This is preferably a large outlet, and as shown in FIG. 6, it has an area of rectangular cross section as it leaves the side of the valve, to provide a relatively large flow area, and yet avoid obstructing the flange bolting seen in FIG. 5. This leads to an area of circular cross-section providing a main drain connection at 133 (FIG. 7) of substantially the same flow area as the rectangular section.

To facilitate servicing, a pair of flange jacking bolts 134 are preferably provided on opposite sides of the valve, when mounted in a pipe-line between flanges as shown in FIG. 5. One such flange jack 134 is shown mounted on a flange bolt, and provided with a pair of bolts mounted in the flange jack body, so that the flanges can be jacked apart by simply turning the bolts on the flange jack.

In addition to the main drain connection, additional bypass connections 136, 137 can be provided on the upstream and downstream sides of the clapper so that the valve can be connected to appropriate bypass piping, gauges or the like.

It will thus be appreciated that the alarm check valves of this invention are of compact form and can be readily serviced as required. Servicing of the alarm check valve can be carried out in a workshop, so that the valve can be thoroughly inspected, rather than inspection being limited to the viewing aperture provided by the cover plate of existing alarm valves.

Finally, it will be appreciated that various alterations or modifications may be made to the foregoing without departing from the spirit or scope of this invention.

I claim:
1. A wafer alarm check valve, said valve including:
   an annular body providing a main flow passage therethrough;
   opposite ends of said body having substantially flat end faces capable of being held between oppositely disposed flanges of a pipeline by bolts clamping said flanges towards one another with said bolts positioned about the periphery of said end faces of the valve to sandwich the valve between the flanges;
   a pivotally mounted clapper within said body having a closed position capable of closing off said main flow passageway, and capable of being pivoted into an open position in which said clapper extends beyond one of said end faces of said body;
   a secondary flow passageway in said body leading from a portion of said body covered by said clapper when in the closed position, and leading to an alarm outlet port for communication with an alarm directly operable by a flow of water out through said alarm outlet port when said clapper moves to the open position to open said secondary flow passageway;
   a main drain port immediately downstream of said clapper, and transverse to said main flow passage;
   said main drain port having a first portion extending beyond the periphery of said end faces of said body;
   said first portion being of substantial rectangular cross-section and having a height extending substantially the full height of the body between said clapper and the downstream end face of the valve, said first portion having a width less than its height to avoid obstructing the positioning of the bolts extending around the periphery of the end faces;
   said main drain port having a second portion for a main drain connection, said second portion extending from said first portion and said second portion being of circular cross-section and having a flow area equivalent to the flow area of said first portion.

2. A wafer alarm check valve as claimed in claim 1, wherein the secondary flow passageway includes a circular channel concentric with the main flow passage, and intersecting at least in part a valve seat portion of said body which is covered by said clapper when in the closed position so that movement of said clapper towards said open position allows fluid to flow in said main flow passage and also into said secondary flow passageway.

3. A wafer alarm check valve as claimed in claim 2, wherein said clapper includes means for spring biasing said clapper towards said closed position.

4. The combination of a wafer alarm check valve as claimed in claim 3, clamped between a pair of flanged pipes in a pipeline by a plurality of bolts between the flanges of the pair of pipes and extending around the periphery of said end faces of said valve body, the combination providing a continuous fluid passageway between one pipe and the other controlled by the clapper of said valve, the combination further including one or more jacking means mounted on at least one of said flange bolts to enable ready release of the wafer alarm check valve from the pipeline.

5. The combination of the pipeline and the wafer alarm check valve as claimed in claim 4, wherein said jacking means includes a jack body mounted on a flange bolt, and having a pair of jack bolts protruding from opposite ends thereof, each jack bolt being capable of engaging the adjacent pipe flange and of being moved towards or away from the adjacent pipe flange to jack the flanges apart.

6. A wet pipe automatic sprinkler system including a main water pipeline having an inlet pipe, a wafer alarm check valve, and an outlet pipe, said wafer alarm check valve being clamped between adjacent flanges of said inlet and said outlet pipes by a plurality of bolts extending around the periphery of said wafer alarm check valve, said wafer alarm check valve including:
   an annular body providing a main flow passage therethrough;
   opposite ends of said body having substantially flat end faces;
   a pivotally mounted clapper within said body capable of closing off said main flow passageway in said body, a secondary passage in said body leading from a portion of said body covered by said clapper when in the closed position, and leading to an alarm outlet port for communication with an alarm operable by a flow of water out through said alarm outlet port when said clapper moves to an open position to open said secondary flow passageway;
   a main drain port immediately downstream of said clapper, and transverse to said main flow passage;
   said main drain port having a first portion extending beyond the periphery of said end faces of said body;
   said first portion being of substantial rectangular cross-section and having a height extending substantially the full height of the body between said clapper and the downstream end face of the valve, said first portion having bolts extending around the periphery of the end faces;
   said main drain port having a second portion for a main drain connection, said second portion extending from said first portion, and said second portion being of circular cross-section and having a flow area equivalent to the flow area of said first portion.

* * * * *